April 15, 1958     H. TORINO ET AL     2,830,576
HOT PLATE SERVER
Filed Dec. 17, 1956
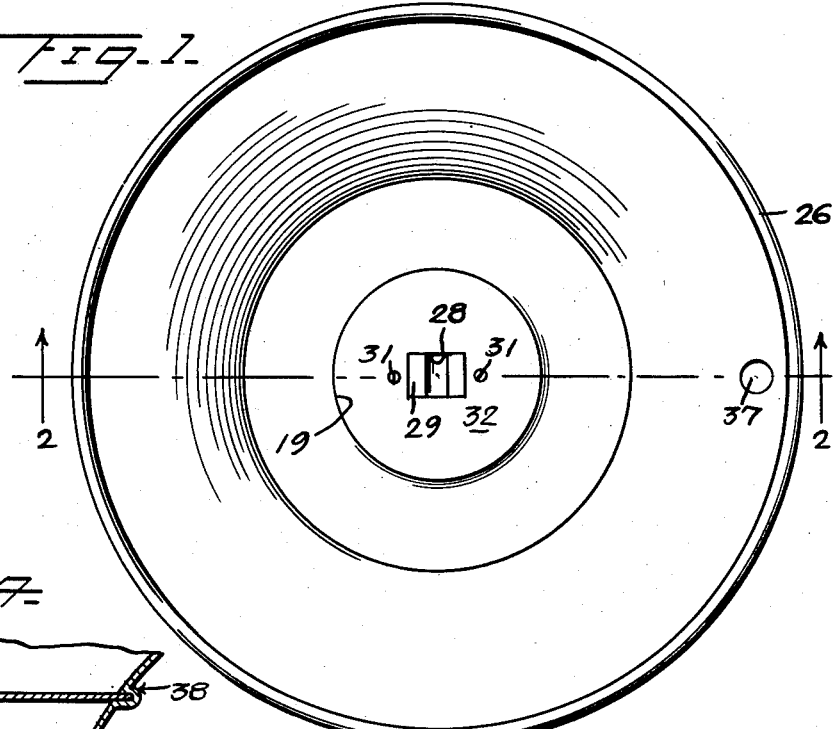
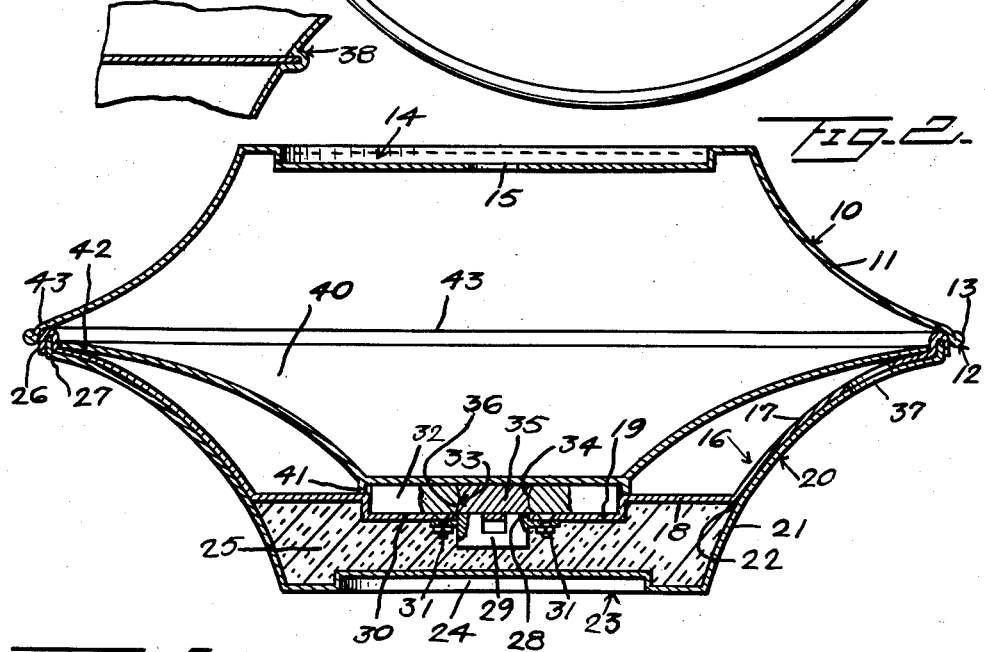
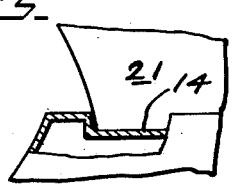
INVENTORS
Henry Torino
Joseph Chillemi
BY Kimmel & Crowell
ATTORNEYS

United States Patent Office 2,830,576
Patented Apr. 15, 1958

2,830,576

HOT PLATE SERVER

Henry Torino and Joseph Chillemi, Washington, D. C.

Application December 17, 1956, Serial No. 628,670

1 Claim. (Cl. 126—246)

This invention relates to a hot plate server, namely, a device for keeping a plate of food warm during transportation thereof from the kitchen to the point of service. A device of this kind has many uses and is particularly useful in connection with the serving of hot food in hospitals, restaurants, at banquets, and in institutions of various kinds.

The device consists essentially of a vessel having a configuration generally the shape of that to conform to an ordinary food plate, a cover, and a removable heat providing means which is seated in a concavity centrally of the vessel, the bottom of the vessel being insulated. In general, a device of this type is known, as for instance, as shown in Alaj Patent Number 2,582,735 of January 15, 1952. However, as will become apparent from the detailed disclosure herein, the present invention embodies many important improvements over the said patented device.

In the Alaj patent, the device consists of the food dish, the receiving vessel, a separate insulating member, a device to provide heat, which is seated in the top of the insulating member, and a cover. In the present device, the separate insulating member is eliminated. At the same time, better insulation is provided, and whereas in the Alaj device, the whole receiving vessel becomes unbearably hot and difficult to handle, this is not at all so in the present device, yet in the present device all the necessary heat is retained for keeping the food warm. Also, in the Alaj device, the heat providing member is clumsy to handle, will fall out of place if the vessel is tilted, and is not easy to install and remove, whereas in the present device, the heat providing member is readily removable and replaceable and will stay in place until removal thereof is desired. Furthermore, the Alaj device is expensive to manufacture and presents problems of sanitation, whereas the present device is cheaper to produce, more efficient, and presents no problems of sanitation. In use, the insulating member of the Alaj device being a separate element, these elements get lost, misplaced, and damaged, with consequent expense of maintenance of the complete serving units, whereas in the present device, there is no separate insulating member to get lost or damaged.

Various other important object and advantages of the invention will be apparent from the detailed explanation thereof.

In the drawings:

Figure 1 is a top plan view looking down into the hot plate server, the cover being removed.

Figure 2 is a cross-sectional view on line 2—2 of Figure 1, including a section through the cover.

Figure 3 is a fragmentary detail view showing the method of stacking the units.

Figure 4 is a fragmentary detail view of a modified form of construction.

As best seen in Figure 2, the hot plate server unit includes a cover 10 having side walls 11 terminating in a bead 12 formed by reverting the edge 13. The central portion of the cover 10 is recessed as at 14 and centrally of the recess is an aperture 15 through which the cover can be easily engaged for removal or to place it in position. The dish or plate receiver and retainer 16 is comprised of arcuate side walls 17 and an integral bottom portion 18 depressed into a recess centrally as at 19 and an outer member 20 having arcuate side walls 21 conforming to the side walls 17 positioned closely adjacent to the latter to the point 22 a short space from the bottom 23 which is integral with the side walls 21. The bottom 23 is recessed centrally thereof as at 24, for a purpose which will be further described. As will be noted, in Figure 2, the bottom 23 of member 20 is spaced below the bottom portion 18 of the plate receiver and retainer 18 to form a pocket in which is packed a heat insulation material 25 such as fiberglass. The outer edges 26 and 27 respectively, of the side walls 17 and 21 are interlockingly permanently engaged to hold the plate receiver 16 and member 20 together.

The recessed portion 24 of bottom 23 is cut-out as at 28 to expose a magnet 29 which is fixed to the underside 30 of bottom 18 adjacent the cut-out 28 by suitable means 31.

Within the recessed portion 19 of bottom 18 and of closely the same diameter as the recess 19 is a heat radiating and retaining plate element 32 of aluminum in the form of a disc and of a thickness to project slightly above the edge of the recess 19. This element 32 has a central aperture 33 with convexly curved walls 34. In the aperture 33 and held permanently therein is a steel or iron plug or core 35 having concavely curved outer walls 36. When the element 32 is formed, as by casting, it is formed around the plug 35 so that the plug is permanently held by the interengagement of the respective curved walls. As will be readily apparent, when the element 32 is placed in the recess 19, it will be held in place by the magnet 29.

The units assembled as seen in Figure 2 and by reason of the recesses in the respective covers can be stacked one on top of the other as indicated in the fragmentary detail view Figure 3.

Figure 4 shows a modified form of construction wherein, if desired, the side walls 17 of plate receiver and retainer 16 can be eliminated by forming the bottom 18, and that portion of the side walls 21 which extends above the bottom 23, and the lower portion of outer member 20 as two separate elements and connecting them as at 38. The construction is otherwise the same as the unit shown in Figure 2.

An aperture 37 is provided in side wall 21 through which a finger or other means can be projected to push the plate or dish 40 out of the receiver 16. The plate 40 is of the usual type which has a bottom rim 41. This rim 41 engages over the projecting portion of element 32 whereby in combination with the seating of the rim 42 of the dish within the flange 43 of receiver 16, the dish is firmly held in place and further assists in keeping the heating element 32 in its proper position. Accidental displacement of the dish and heating element is effectively prevented, and yet when desired, the several elements are readily taken apart.

In the use of the invention, the element 32 is heated by suitable means, placed in position in the plate receiver where it is held by the magnet; the dish is filled with food, placed in position in the receiver or alternatively placed in position in the receiver and then filled with food, after which the cover is placed in position.

It is found that while the food will be effectively kept warm, the outer side walls of the unit will remain cool enough for comfortable handling and for example, can be safely used in serving a hospital patient. The heating element is effectively insulated against spreading heat to either the bottom of the unit or the side walls thereof.

What is claimed is:

A hot plate server comprising a plate holder having a pair of upper and lower spaced apart circular bottoms, said upper bottom having a circular recess located centrally thereof, an upwardly and outwardly flaring outer side wall formed intergally on the peripheral edge of said lower bottom, an upwardly and outwardly flaring inner side wall formed integrally on the peripheral edge of said upper bottom, said inner side wall conforming to the shape of and engaging said outer side wall, said inner side wall having its upper outer edge crimped outwardly over the upper outer edge of said outer side wall, insulation positioned between said upper and lower bottoms, a magnet fixedly secured in depending relation to said upper bottom centrally of said recess, an aluminum heat retaining and radiating plate having a centrally located ferrous metal core, said plate being held in said recess by the action of said magnet, and a domed cover having the peripheral edge thereof engaging over the outwardly crimped upper outer edge of the inner side wall of said plate holder, said heat retaining plate having spaced parallel faces and having a central circular aperture extending from one face to the other face, said aperture decreasing in diameter from each face inwardly of said plate in a convex curve, and said core shaped to completely fill said aperture.

References Cited in the file of this patent
UNITED STATES PATENTS

| | | |
|---|---|---|
| 425,768 | Ezell | Apr. 15, 1890 |
| 1,881,873 | Newcomb | Oct. 11, 1932 |
| 2,217,514 | Henry | Oct. 8, 1940 |
| 2,582,735 | Alaj | Jan. 15, 1952 |
| 2,690,743 | Flourroy | Oct. 5, 1954 |